G. I. ROCKWOOD.
AUTOMATIC SPRINKLER.
APPLICATION FILED JUNE 8, 1908.
927,430.
Patented July 6, 1909.
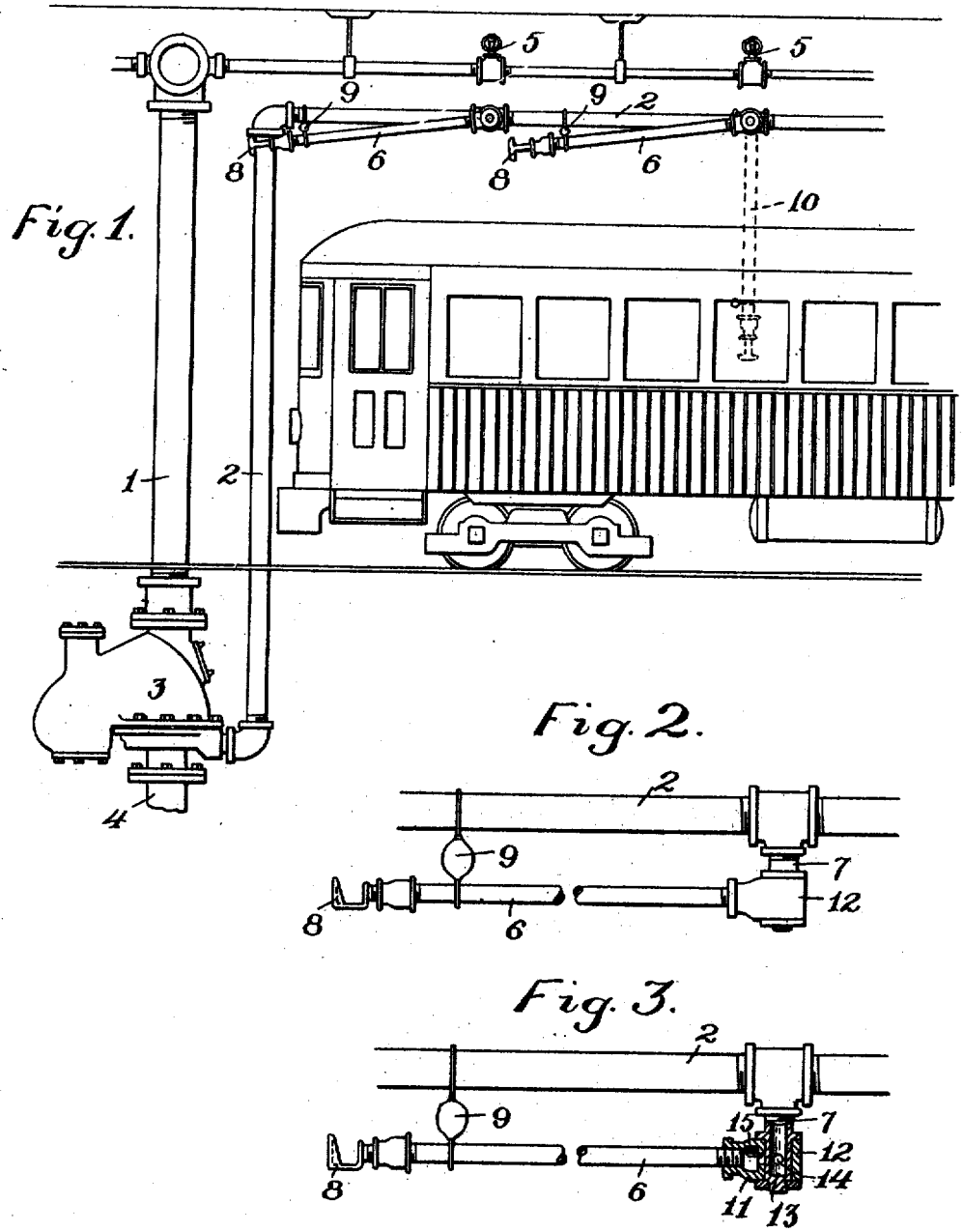
Witnesses
Roy D. Tolman
Penelope Cruikshank
Inventor
George I. Rockwood.
By Rufus B. Fowler
Attorney.

UNITED STATES PATENT OFFICE.

GEORGE I. ROCKWOOD, OF WORCESTER, MASSACHUSETTS.

AUTOMATIC SPRINKLER.

No. 927,430.     Specification of Letters Patent.     Patented July 6, 1909.

Original application filed February 4, 1908, Serial No. 414,194. Divided and this application filed June 8, 1908.
Serial No. 437,241.

*To all whom it may concern:*

Be it known that I, GEORGE I. ROCKWOOD, a citizen of the United States, residing at Worcester, in the county of Worcester and Commonwealth of Massachusetts, have invented a new and useful Improvement in Automatic Sprinklers, of which the following is a specification, accompanied by drawings forming a part of the same, and forming a divisional application of my pending application, Serial No. 414,194, filed February 4, 1908, in which—

Figure 1 is an elevation of a sprinkler system in which my improved automatic sprinklers are employed. Fig. 2 is a plan view of one of the sprinklers, and Fig. 3 is the same partly in section.

Similar reference figures refer to similar parts in the different views.

My present invention relates to automatic sprinklers arranged to be closed normally and to be opened by the action of heat, and it consists in the construction and arrangement of parts as hereinafter described and pointed out in the annexed claims.

Referring to the accompanying drawings, in Fig. 1 I have shown my improved automatic sprinklers employed in the place of a series of open sprinklers in a sprinkler system for a car barn or shed. In that figure there are two supply pipes 1 and 2, connected by a valve 3 with a water supply pipe 4. The valve 3 is a dry pipe valve and may be of any approved construction. The pipe 1 leads to one or more closed sprinklers 5, which are arranged to open at a predetermined degree of heat and thereby release the dry pipe valve 3. Connected with the supply pipe 2 open sprinklers are usually employed, to which the water is admitted by the opening of the valve 3.

The above described sprinkler system furnishes an opportunity for the admission of water to the entire series of open sprinklers by the application of heat to one of the closed sprinklers, and is like that shown in my pending application, Serial No. 414,194, filed Feb. 4, 1908, of which the present is a divisional application.

My present invention comprises a series of swinging pipes 6 pivotally connected to the water supply pipe 2 in the place of the ordinary open sprinkler head. The swinging pipes 6 are connected with a horizontal pipe 7 by a swiveled joint connection, and each carries at its free end open sprinklers 8. Each of the swinging pipes 6 is also suspended near its free end from an overhead support, in the present instance, from the pipe 7 by a link 9, which is fusible at a predetermined degree of heat. Upon the melting of the link 9 its supported pipe swings downward into a vertical position, as shown by the dotted lines 10.

The swiveled connection between the swinging pipes 6 and the horizontal pipe 7 is constructed as follows:—Each of the pipes 6 is screwed into a head 11 provided with a transverse tubular bearing 12, arranged to turn upon a hollow arm 13 which communicates with the pipe 7. The hollow arm 13 is closed at its outer end and is provided with a restricted opening 14, which is closed by the tubular bearing 12 when the pipe 6 is in its raised position, supported by the link 9. When, however, the link 9 is melted and the pipe swings into the position shown by the dotted lines 10, the opening 14 is brought into registration with an opening 15 in the tubular bearing 12, which communicates with the pipe 6 and allows water to pass through the open sprinkler 8.

It is, of course, obvious that my improved swinging sprinkler may be used in different situations, and it is valuable in every case where a sprinkler may be required, but where its constant presence would be objectionable.

I claim,

1. The combination with a water supply pipe and a sprinkler head, a swinging pipe carrying said sprinkler head and connected with said supply pipe, thereby forming a communication between said supply pipe and said sprinkler head, means fusible at a predetermined degree of heat for holding said swinging pipe against gravity, and means operated by the movement of said pipe for opening said communication when said swinging pipe has fallen and closing said communication when said pipe is raised.

2. In a sprinkler system, the combination with a swinging pipe, a sprinkler head carried by said swinging pipe, means fusible at a predetermined degree of heat for holding said pipe against gravity in an elevated position, a water supply pipe having a communication with said swinging pipe, arranged to be closed when the swinging pipe is raised and opened by the falling movement of the swinging pipe.

3. In a sprinkler system, the combination with a swinging pipe, a sprinkler head carried by said swinging pipe, a water supply pipe connected with said swinging pipe by a pivotal joint comprising a tubular arm and a tubular bearing therefor, said arm having a hole for the passage of water communicating with the swinging pipe when the pipe is lowered and closed by the tubular bearing when the pipe is raised, and means fusible at a predetermined degree of heat for holding said pipe raised.

GEORGE I. ROCKWOOD.

Witnesses:
PENELOPE COMBERBACH,
RUFUS B. FOWLER.